George A. Akin
Harrell J. Lewis
Toy F. Reid
INVENTORS

United States Patent Office 3,334,149
Patented Aug. 1, 1967

3,334,149
PLURAL STAGE HYDROGENATION OF DIALKYL TEREPHTHALATE USING PALLADIUM AND THEN COPPER CHROMITE
George A. Akin, Marl, Germany, and Harrell J. Lewis and Toy F. Reid, Kingsport, Tenn., assignors to Eastman Kodak Company, Rochester, N.Y., a corporation of New Jersey
Filed July 21, 1964, Ser. No. 385,827
11 Claims. (Cl. 260—617)

This application is a continuation-in-part of our U.S. Ser. No. 43,454, filed July 18, 1960, and now abandoned which is in turn a continuation-in-part of our U.S. Ser. No. 689,243, filed Oct. 9, 1957, and now abandoned.

This invention relates to a process for the preparation of 1,4-cyclohexanedimethanol from dialkyl terephthalate.

1,4-cyclohexanedimethanol is particularly useful in the preparation of polyester fibers through condensation with dicarboxylic acids as disclosed in U.S. Patent No. 2,901,466. The process of our invention is based on our discovery that by the use of a novel combination of catalytic reaction stages, especially when coupled with procedures that control the reaction conditions in the continuous operation of the process, one can produce in high yield and conversion a 1,4-cyclohexanedimethanol product of such purity that, without extensive further purification, it can be fed to a poly condensation reaction to yield a polyester of high quality suitable for fiber manufacture. Our invention thus provides an economically feasible method for converting dialkylterephthalate to 1,4-cyclohexanedimethanol suitable for polyester manufacture.

We have found that 1,4-cyclohexanedimethanol can be prepared by the hydrogenation of dialkyl terephthalate in a two-stage catalytic process in which a palladium catalyst is used in the first stage, wherein the dialkyl terephthalate is partially hydrogenated, and a copper chromite catalyst in the second stage, wherein the hydrogenation process is carried to completion. The process of the invention has particular utility for hydrogenating dialkyl terephthalate wherein the alkyl moiety has 1 to 4 carbon atoms, a typical reactant being dimethyl terephthalate.

The type of palladium hydrogenation catalyst can be widely varied, any conventional palladium hydrogenation catalyst being suitable. A typical palladium catalyst suitable for use in our process comprises from about 0.25 to about 10% by weight palladium deposited on a suitable support, such as dehydrated or activated alumina, kieselguhr, activated carbon, dehydrated zirconium dioxide, dehydrated silica gel, chromium oxide, bentonite, asbestos, and the like. However, for the purposes of the invention it has been found that if the carrier or support is alumina or activated carbon particularly good results are obtained. The support for the palladium may be in the form of pellets or granules. For the purposes of the hydrogenation process of this invention a fixed catalyst bed is preferred. The supported palladium catalyst is prepared in any suitable manner, e.g. by treating the carrier with a solution of a suitable palladium compound and then reducing such compound to palladium metal.

The copper chromite catalyst can be any conventional copper chromite hydrogenation catalyst. It can be prepared by known methods, such as, for example, by decomposition of complex copper chromate salts, such as basic copper ammonium chromate, by methods well known in the art. The finely-divided copper chromite catalyst is usually pressed into pellets. A water-soluble binding agent, such as sodium silicate, and other related water-soluble salts, and water-soluble organic material such as sugar, starch, pectin, various vegetable gums, dextran, and the like, are typically used in the pelleting operation. A copending application by Hasek et al., U.S. Ser. No. 724,270, filed Mar. 27, 1958, and now abandoned describes a method for improving the effectiveness of such catalysts comprising subjecting the catalyst to a water leaching treatment. Particularly effective copper chromite-type catalysts contain barium oxide and are known to the art as "barium-promoted" catalysts. Suitable catalysts are those containing copper corresponding to 30–80% cupric oxide (CuO); chromium corresponding to 15–55% chromic oxide ($CR_2O_3$); and barium corresponding to 0–15% barium oxide (BaO). Pelleted forms of these catalysts may contain from 2 to 25% by weight of water-soluble binder. Extraneous water-insoluble agents, such as graphite die lubricants, preferably should be absent. It is desirable that the catalysts be pelleted to a density such that the average side crushing strength is in excess of about five pounds. Suitable pelleted copper-chromium-oxide type catalysts that may be used in the invention typically vary in size from about $\frac{3}{16}$ inch to $\frac{1}{2}$ inch in diameter, with comparable lengths.

The unexpectedness of the results of the hydrogenation of dialkyl terephthalate by this particular two-stage palladium-copper chromite catalytic arrangement may be further demonstrated by contrasting it with other arrangements of catalysts. For instance, if the palladium and copper chromite catalysts are reversed, the aromatic nucleus is apparently not affected, but instead the ester groups external to the aromatic nucleus are converted to glycol groups and methyl alcohol, part of the unsaturated glycol then being further reduced to xylene and water, if the hydrogenation is continued, the water having a deactivating effect upon the copper chromite catalyst. If, on the other hand, palladium and copper chromite catalysts are mixed in a single bed, water is again formed from the production of xylene from the unsaturated glycol. The use of only one of the two catalysts, either the palladium catalyst or the copper chromite catalyst, fails to produce any appreciable amount of 1,4-cyclohexanedimethanol. The use of other hydrogenation catalysts or combinations of catalysts also proves unsatisfactory. For example, the use of nickel in the first reaction stage yields a first stage product apparently contaminated with an impurity that has a deleterious effect on the copper-chromite stage.

Although we are not certain as to the exact mechanism of the conversion of dialkyl terephthalate to 1,4-cyclohexanedimethanol or the reasons therefor, we theorize that the hydrogenation reaction involves two phases, the first of which occurs in the first stage of the process of this invention and consists of the hydrogenation of the dialkyl terephthalate to the corresponding 1,4-cyclohexanedicarboxylate ester as a result of the palladium catalyst, and the second of which occurs in the second stage of the process and consists of the conversion of this saturated diester to 1,4-cyclohexanedimethanol by hydrogenolysis through the influence of the copper chromite catalyst. For some unknown reason, if our theory is correct, the palladium catalyst appears to achieve substantially complete hydrogenation of the unsaturated ring to the saturated form without forming substantial amounts of substances harmful to the copper chromite catalyst and the latter is specific for the hydrogenation of the saturated ester to the corresponding diol, the two catalysts thus forming an unexpectedly advantageous combination for the hydrogenation of dialkyl terephthalate to 1,4-cyclohexanedimethanol.

In our process the hydrogenation pressure can be varied, e.g., in the range of from about 50 to 500 atmospheres, with a pressure in the range of from about 200 to 400 atmospheres being most suitable. The temperature of the reaction likewise can be varied, e.g. in a range of from about 100° C. to 400° C., with a temperature in the range of from about 150° C. to 275° C. being most suitable.

In one embodiment of the two-stage hydrogenation process of this invention, each hydrogenation stage has one reactor or zone of reaction. Dimethyl terephthalate is used in this embodiment as representative of the dialkyl terephthalates which can be hydrogenated in accordance with this invention. Molten dimethyl terephthalate and hydrogen are fed continuously to the single reactor or zone of the first hydrogenation stage wherein the palladium catalyst is located. The feed rate of the dimethyl terephthalate is adjusted so that sufficient excess hydrogen remains to be passed on in the effluent from this single reactor or zone of the first hydrogenation stage to a single reactor or zone of the second hydrogenation stage containing the copper chromite catalyst. However, additional hydrogen may be added to the second hydrogenation stage, if desired. Also, cooled hydrogen may be recycled from each stage back into the same stage. We have found that when hydrogen is recycled from each stage, best results are obtained when from about 0.9 to about 1.8 lbs. of hydrogen per pound of dimethyl terephthalate fed to the first stage are used and when from about 1 to about 3 lbs. of hydrogen per pound of effluent from the first stage fed to the second are used. A portion of the cooled, crude product from each stage may be returned with the feed stream thereto to control the temperature, the hydrogenation reaction being exothermic. Some of the benefits of the invention can be achieved even when the temperature is controlled with heat exchangers, but we have found that the most outstanding results in accordance with the invention are obtained when the temperatures are controlled by the described reflux and feed control procedures in combination with the particular catalytic sequence that characterizes our process. Both stages are operated within approximately the same temperature and pressure ranges given hereinabove. The 1,4-cyclohexanedimethanol is collected from the second stage. By-product methyl alcohol may be removed easily by distillation and condensation. However, we have found that the presence of the methyl alcohol serves to reduce the melting point of the 1,4-cyclohexanedimethanol to a value which allows it to be conveniently handled at ambient temperatures. The vent gas may be purified and returned to the first stage as pure hydrogen, if desired.

In an alternative embodiment of this invention, each of the two reaction stages is divided into two or more zones or reactors. The feed rate of dialkyl terephthalate is adjusted in the first or palladium-catalyzed reaction stage so that only partial hydrogenation takes place in the first zone thereof, the remainder of the hydrogenation reaction attributable to the palladium catalyst taking place in the remaining zone or zones of said first or palladium-catalyzed reaction stage. The second or copper chromite-catalyzed hydrogenation stage is likewise divided into two or more separate zones, only partial hydrogenation attributable to the copper chromite catalyst occurring in the first zone thereof, hydrogenation continuing in the remaining zone or zones thereof unti the 1,4-cyclohexanedimethanol is recovered from the last zone.

A portion of the liquid effluent from any zone of the first or palladium-catalyzed hydrogenation stage may be recycled to the same zone from which it came or to any preceding zone of said first or palladium-catalyzed hydrogenation stage for temperature-control purposes. Similarly, a portion of the liquid effluent from any zone of the second or copper chromite-catalyzed hydrogenation stage may also be recycled to the same zone from which it came or to any preceding zone of said second or copper chromite hydrogenation stage to control the temperature.

The total amount of feed to the first zone of the palladium-catalyzed stage contains dialkyl terephthalate material having a heat of reduction to the corresponding saturated diester equivalent to not more than about 0.6 part by weight of the dialkyl terephthalate per part by weight of said feed to the first zone of the palladium-catalyzed stage and, preferably between 0.04 and 0.16 part by weight of the dialkyl terephthalate per part by weight of said feed to the first zone of the palladium-catalyzed stage. Similarly, the total amount of feed to the first reactor of the copper chromite-catalyzed zone contains material having a heat of reduction to 1,4-cyclohexanedimethanol equivalent to not more than about 0.6 part by weight of saturated diester per part by weight of said feed to the first zone of the copper chromite-catalyzed stage, and preferably between 0.04 and 0.16 part by weight of saturated diester per part by weight of said feed to the first zone of the copper chromite-catalyzed stage.

By maintaining the amount of reducible dialkyl to terephthalate in the feed to the first zone of the palladium-catalyzed stage and the amount of reducible saturated diester in the feed to the first zone of the copper chromite-catalyzed stage at these levels, the amount of reducible dialkyl terephthalate in the feed to the second zone of the palladium-catalyzed stage and the amount of reducible saturated diester in the feed material to the second zone of the copper chromite-catalyzed stage are also established. Thus, the feed to the latter two zones usually contains, respectively, reducible dialkyl terephthalate and reducible saturated diester having a heat of reduction to the saturated diester in the case of the dialkyl terephthalate and to 1,4-cyclohexanedimethanol in the case of the saturated diester equivalent to not more than about 0.3 part by weight, and more usually, between 0.02 and 0.08 part by weight of dialkyl terephthalate or the saturated diester per part by weight of said feed to each of said zones.

The vent gas from the second hydrogenation stage may be purified by passing over an appropriate adsorbent and/or other suitable means and returned as purified hydrogen for addition anywhere along the line. This purification is accomplished by a series of steps. First the vent-gas stream is passed through a condenser to remove water, methyl alcohol, and other condensible vapors. The gas stream then passes through a preheater where it is heated to a temperature between 225° C. and 425° C. It then enters one of two methanators, arranged so as to be used alternately to allow time for off-stream changing of catalyst, in which the carbon monoxide and hydrogen contained in the vent-gas stream react to give methane and water. The methanators contain a nickel-based or other suitable catalyst bed and are operated at a temperature of between 225° C. and 425° C. and at pressures up to the operating pressure of the hydrogenation zones of reaction or reactors. Metals of the eighth periodic group, including iron, cobalt, ruthenium, rhodium, palladium, osmium, iridium, and platinum, in addition to nickel, are suitable catalysts for the methanation reaction between the carbon monoxide and the hydrogen. The catalyst may be in the finely-divided metallic state or in the form of a salt which does not interfere with the reaction, such as the chloride, carbonate, oxide, acetate, or stearate. The gas leaving the methanator is cooled to remove any easily condensible materials and is then further cooled to a temperature as low as —75° C. before it enters one of two methane adsorbers, also arranged to be operated alternately. Each methane adsorber is regenerated periodically by reducing the pressure, increasing the temperature to between 100° C. and 300° C. and passing a flow of inert gas such as nitrogen through the adsorbent contained therein to the atmosphere. Each adsorber is operated at a temperature of as low as —75° C. and at a pressure as high as that used in the two hydrogenation stages. Substantially all of the methane present in the gas stream at this phase of the operation is adsorbed by a suitable adsorbent contained in the adsorber, e.g. activated carbon, silica gel, activated alumina, calcium and sodium alumino-silicates and the like. The effluent from the methane adsorber is substantially pure hydrogen, which is compressed and recycled.

A better understanding of our invention may be obtained from the drawings, which are flow diagrams of preferred embodiments thereof. It is to be understood that the drawings are illustrative only and that the invention is not to be limited thereby.

The process of the invention is illustrated below in the apparatus set out in FIGS. 1 and 2 with respect to a dimethyl terephthalate reactant.

Figure 1:
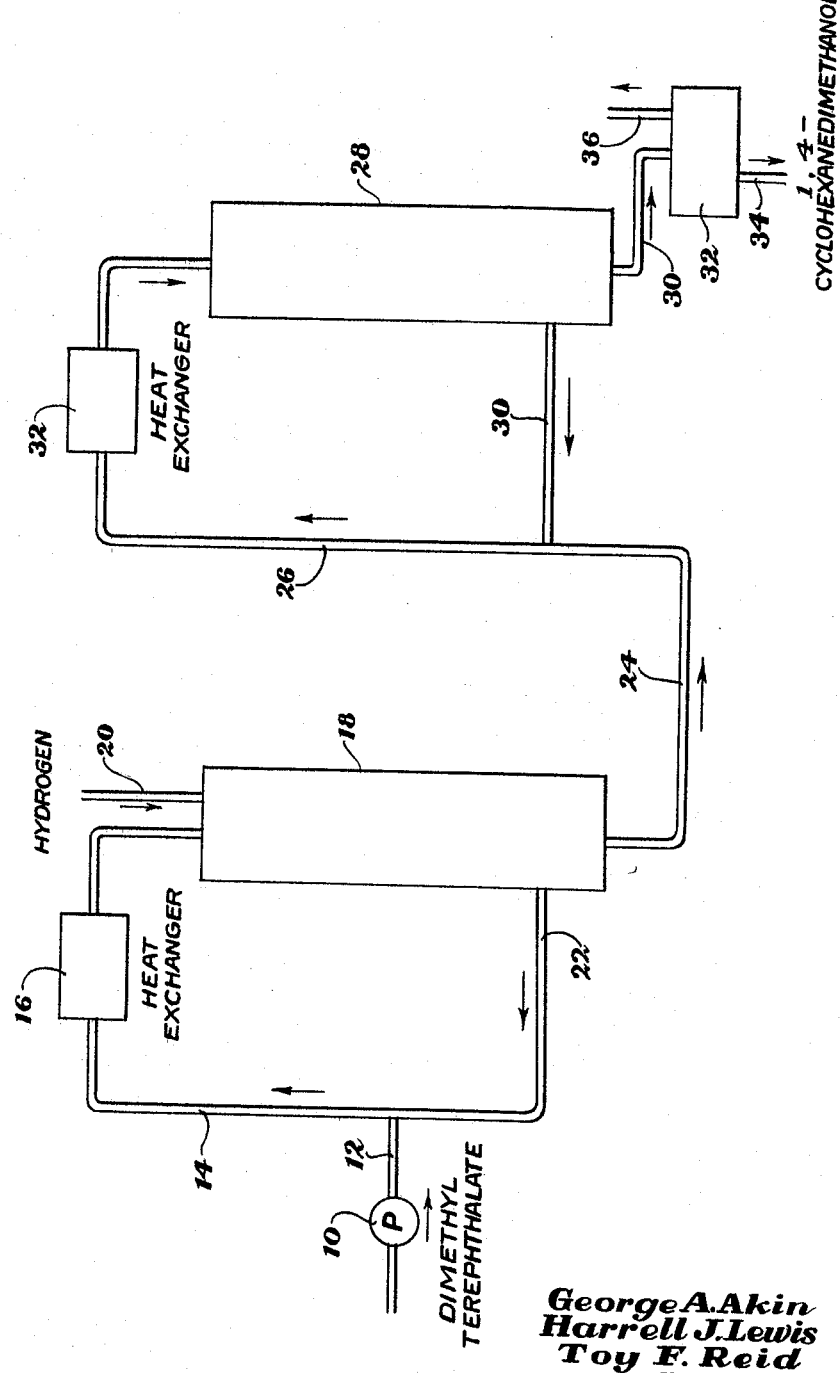
FIG. 1 illustrates the two-stage hydrogenation reaction of this invention wherein each stage consists of only one reactor or zone of reaction, the first reactor containing the palladium catalyst and the second the copper chromite catalyst.

In FIG. 1, molten dimethyl terephthalate is continuously pumped by means of pump 10 through conduit 12 to conduit 14 where it is combined with recycle hydrogen described hereinbelow, the resulting mixture being conveyed through heat exchanger 16 in conduit 14, and then to reactor 18, the only reactor of the first hydrogenation stage, which contains a palladium catalyst. Hydrogen gas under pressure is continuously added to reactor 18 through conduit 20. Hydrogen is recycled from reactor 18 through conduit 22. The liquid output of reactor 18 is continuously conveyed through conduit 24 and on through conduit 26 to a second reactor 28, the only reactor of the second hydrogenation stage, said reactor 28 containing a copper chromite catalyst. Said liquid output of reartor 18 is joined on the way to reactor 28 by recycled hydrogen from reactor 28, said hydrogen entering through conduit 30 from reactor 28, and the combined stream passes through heat exchanger 32 prior to entrance to reactor 28. Effluent is collected from reactor 28, after passing through conduit 30, in a gas-liquid separator 32. 1,4-cyclohexanedimethanol is drawn from gas-liquid separator 32 via conduit 34. Gaseous by-products are vented through conduit 36. The recycled hydrogen from both reactors may be compressed and cooled prior to joining the primary liquid stream.

Figure 2:
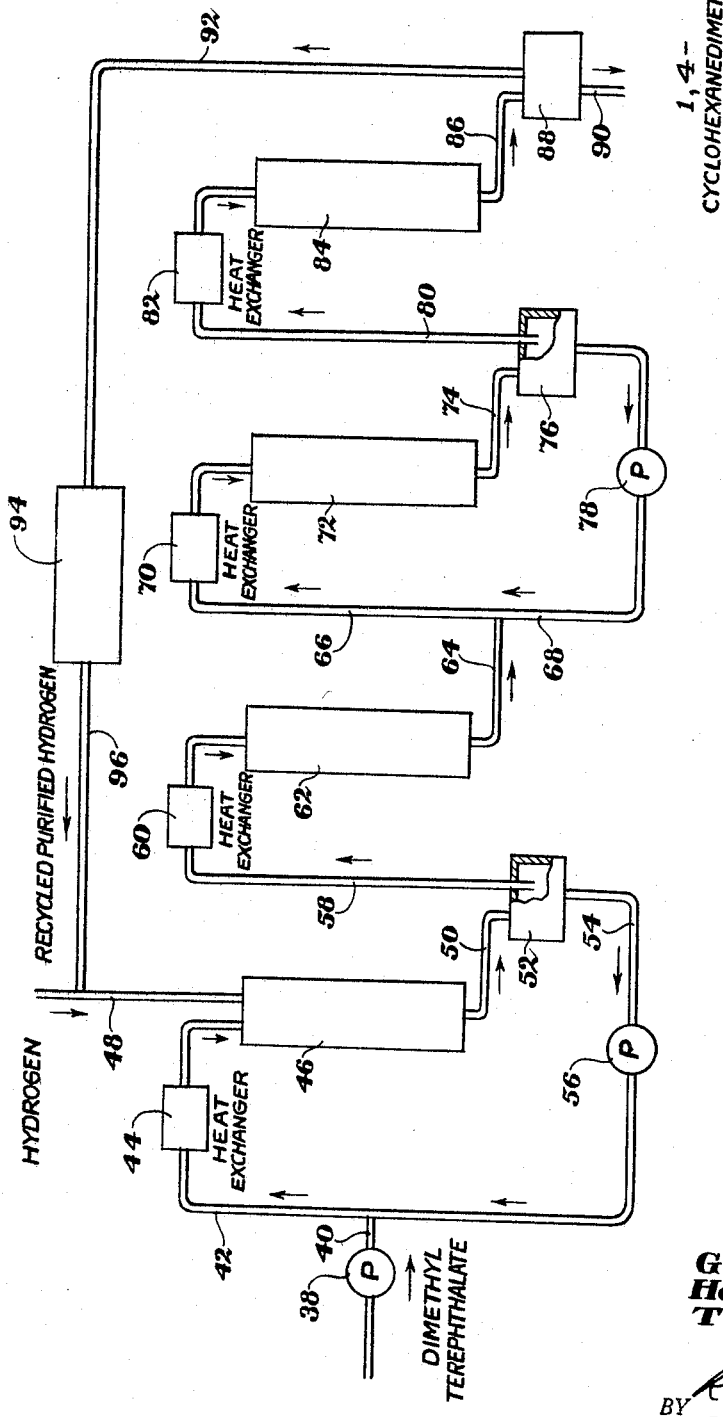
FIG. 2 represents the two-stage hydrogenation operation when conducted in four separate reactors or zones of reaction, the first stage consisting of two palladium-catalyzed reactors and the second stage consisting of two copper chromite-catalyzed reactors.

In FIG. 2, dimethyl terephthalate is continuously pumped by means of pump 38 through conduit 40 to conduit 42, where it is combined with recycled material which is described hereinbelow, and the resulting mixture conveyed through heat exchanger 44 in conduit 42 and then to reactor 46, the first reactor of the palladium-catalyzed hydrogenation stage. Hydrogen gas under pressure, supplemented by recycled purified hydrogen, is continuously added to reactor 46 through conduit 48. Dimethyl terephthalate, recycled material, and hydrogen flow through the reactor 46 to conduit 50 and then, together with the products of partial hydrogenation, to enclosed reservoir 52. A portion of the liquid output of reactor 46 is continuously conveyed from enclosed reservoir 52 through conduit 54 containing pump 56 to be recycled to reactor 46 via conduit 42 with additional portions of dimethyl terephthalate entering the system through conduit 40. The amount of liquid recycled is varied sufficiently to prevent excessive heat buildup in the reactor 46. The portion of the output of reactor 46 in enclosed reservoir 52 that is not recycled is continuously conveyed through conduit 58 containing heat exchanger 60 to reactor 62, the second reactor of the palladium-catalyzed hydrogenation stage. The effluent from said reactor 62 passes through conduit 64 to conduit 66, where it is supplemented by a recycled material described hereinbelow, which enters through conduit 68. The combined streams pass through heat exchanger 70 and on to reactor 72, the first reactor of the copper chromite-catalyzed hydrogenation stage. The effluent from reactor 72 flows through conduit 74 to enclosed reservoir 76. A portion of the liquid output of reactor 72 is continuously conveyed from enclosed reservoir 76 through conduit 68 containing pump 78, being recycled with additional portions of the effluent from reactor 62 to reactor 72. Again the amount recycled depends upon the amount of exothermic heat to be controlled. The portion of the output of reactor 72 in enclosed reservoir 76 that is not recycled to reactor 62 is continuously conveyed through conduit 80 and heat exchanger 82 to reactor 84, the second reactor of the copper chromite-catalyzed hydrogenation stage. The effluent from reactor 84, consisting principally of 1,4-cyclohexanedimethanol, passes through conduit 86 into gas-liquid separator 88. 1,4-cyclohexanedimethanol is collected from gas-liquid separator 88 at conduit 90 and the vent gases recycled therefrom via conduit 92 to a purification unit 94 from which substantially pure hydrogen is conveyed through conduit 96 to supplement hydrogen entering reactor 46, the first reactor of the palladium-catalyzed hydrogenation stage through conduit 48. The effluent gas from gas-liquid separator 88 is thus converted to substantially pure hydrogen for recycling to the original reactor 46 under pressure.

When a hydrogenation apparatus such as that illustrated in FIG. 2 is used, the ratio of feed entering reactor 46, the first reactor of the first or palladium-catalyzed hydrogenation stage and reactor 72, the first reactor of the second or copper chromite-catalyzed hydrogenation stage to the liquid recycle material mixed therewith is regulated to an extent such that a liquid-diluting effect results which serves to control the amount of reducible material in each of these two reactors. It is possible to thus regulate the amount of heat generated in reducing or hydrogenating the material fed into said reactors. Pumps and valves may be used to assist in such regulation. Heat exchangers in the feed conduits leading to each of the four reactors serve to regulate the temperature of the feed to the respective reactors. Such heat exchangers can serve both to remove excess heat generated in the system and to heat the feed material to the reactors to the desired temperature. The input dimethyl terephthalate is generally below the desired reaction temperature, and hence the recycle material from the first reactor of the first or palladium-catalyzed stage serves to warm this feed material after being mixed therewith and to thus dissipate the heat generated in the exothermic hydrogenation reaction.

The invention is further illustrated by the following examples. The abbreviations s.c.f.h. and s.c.f.m. used in these examples refer respectively to standard cubic feet per hour and standard cubic feet per minute.

EXAMPLE 1

A flow of about 70 lbs. per hour of molten dimethyl terephthalate at a temperature of about 160° C. and a flow of about 1165 s.c.f.h. of a gas containing 98.9 volume percent hydrogen, 0.23 volume percent nitrogen, 0.001 volume percent oxygen, and 0.86 volume percent methane at a temperature of about 175° C. were fed to a hydrogenation unit composed of two reactors in series such as those shown in FIG. 1. The pressure in the first reactor was 5500 p.s.i.g. and was slightly less than this in the second and final reactor. The stream of molten dimethyl terephthalate and hydrogen was joined by a stream of recycle hydrogen which had been cooled to the extent that after being compressed to about 5515 p.s.i.g. the temperature was about 175° C. The recycle hydrogen flow amounted to about 80 lbs. per hour. The hydrogenation carried out in this first reactor was conducted over a palladium catalyst. The palladium catalyst consisted essentially of about 0.5% by weight palladium coated on 1/16 inch extruded alumina pellets (Lot No. 3709, Baker and Co., Inc.). The effluent from the first reactor flowed into the top of a second reactor along with a recycle hydrogen stream. This recycle stream, which amounted to about 170 lbs. per hour, had been cooled to such an extent that, upon being compressed to about 5510 p.s.i.g. and mixed with the effluent from the first reactor, a mixture temperature of about 250° C. was obtained. The second reactor contained about 200 lbs. of a copper chromite catalyst (Cu 1107 T ⅛″, manufactured by Harshaw Chemical Company). In this reactor the hydrogenation reaction was carried to completion with the production of 1,4-cyclohexanedimethanol and by-product methyl alcohol. A part of the methanol is carried away with the vent gases and may be readily condensed therefrom. The conversion of the dimethyl terephthalate to 1,4-cyclohexanedimethanol was 97 mole percent. After separation of the methyl alcohol therefrom, the vent gases contained about 93 volume percent of hydrogen, the remainder consisting of nitrogen, oxygen, methane and carbon monoxide. The vent gases totalled about 265 s.c.f.h. Operation of the two reactors was continued, the amount of hydrogen recycled to each reactor being varied to illustrate the optimum amount useful in controlling the reaction rate and yield and the more efficient use of both catalysts in obtaining a purer product in a higher yield. When the rate of hydrogen removed from the first reactor and recycled thereto was reduced to below 0.9 lb. of hydrogen per pound of dimethyl terephthalate feed to the first reactor, the yield of hydrogenated material was reduced to an unsatisfactory and inefficient amount, and a substantial amount of dimethyl terephthalate was lost by way of side reactions. On the other hand, when the rate of hydrogen removed from the first reactor and recycled thereto was increased beyond 1.8 lbs. of hydrogen per pound of dimethyl terephthalate feed to the first reactor, the reaction rate was substantially lowered. Similar results were obtained when the amount of hydrogen recirculated through the second reactor amounted to less than 1.0 lb. per pound of feed from the first reactor to the second or more than 3.0 lbs. per pound of feed from the first reactor to the second. It is not essential that the recycle streams of hydrogen be cooled and mixed with the reactor feed streams as described in this example. The procedure was varied so as to introduce the recycle streams of hydrogen to the reactors separate and apart from the feed material. Equally good results were obtained. Also, after several hours about 50 lbs. per hour of fresh hydrogen were introduced to the second reactor to supplement the excess hydrogen carried over from the first reactor and the recycled hydrogen with a continued high yield of 1,4-cyclohexane-dimethanol. In addition, the same hydrogenation process was successfully operated with a 60 mole percent conversion of dimethyl terephthalate to 1,4-cyclohexanedimethanol, when the pressure in the second reactor was lowered to about 50 atmospheres by condensing methanol from the recycled hydrogen streams and thus decreasing the concentration thereof inside said second reactor. When the hydrogenation process was carried out under the same conditions but without condensing out the methanol, the conversion to 1,4-cyclohexanedimethanol was less than 10 mole percent.

EXAMPLE 2

The hydrogenation of dimethyl terephthalate was conducted in accordance with the procedure of Example 1 using fresh highly active catalyst, with similar results, except that in addition a portion of the effluent from each reactor was recirculated through the same reactor. The same flow rates, temperatures, and pressures were maintained except that about 700 lbs. per hour of liquid effluent from the first reactor were recycled thereto, and about 1000 lbs. per hour of liquid effluent from the second reactor were recycled to said second reactor. Conversion to 1,4-cyclohexanedimethanol was about 95 mole percent at the beginning of the run, which lasted for three days, and about 91 mole percent at the end of the run.

EXAMPLE 3

The same procedure as in Example 1 was followed except that instead of recycling hydrogen through each reactor the vent gases were converted to pure hydrogen by condensation and adsorption and then recycled to the first reactor at a temperature of 175° C. The vent gases were cooled to a temperature of about 5° C. to condense water vapor and methyl alcohol vapor therefrom. The condensed liquids were collected in a receiver and removed periodically. The remaining gas was then heated to about 330° C. in a preheater and passed through about 30 lbs. of a nickel-based catalyst maintained at about 330° C. in a methanator wherein the carbon monoxide reacted with hydrogen to produce methane and water. The effluent from the methanator was cooled to about 2° C. to condense most of the water resulting from the reaction. This water was collected in a receiver and removed periodically. The vent gas, now containing hardly any detectable amount of carbon monoxide was further cooled to about −75° C. It was then fed into a methane adsorber maintained at about −75° C. and containing about 50 lbs. of a calcium alumino-silicate adsorbent where practically all of the methane and nitrogen were adsorbed. Substantially pure hydrogen remained containing only small traces of oxygen and nitrogen. This gas was now at a pressure of about 5470 p.s.i.g. It was compressed to a pressure of about 5520 p.s.i.g. and fed back to the first hydrogenation reactor. Methane adsorbers were switched each four hours and while one was on stream, the other was being regenerated. Substantially complete conversion of dimethyl terephthalate to 1,4-cyclohexanedimethanol was attained in this example. The amount of hydrogen recycled to the first reactor was about 100 lbs. per hour.

EXAMPLE 4

Again the general procedure of Example 1 was followed, but this time no hydrogen was recycled from either reactor. Substantially complete hydrogenation of the dimethyl terephthalate was achieved, but the conversion to 1,4-cyclohexanedimethanol was less than 70 mole percent, apparently due to the increased temperature.

EXAMPLE 5

Dimethyl terephthalate was converted to 1,4-cyclohexanedimethanol as in Example 1, but in this case, instead of recycling hydrogen from each reactor to the same reactor, the vent gases were purified by condensation and adsorption exactly as described in Example 3 and reconveyed to the first reactor as purified hydrogen, and in addition, a portion of the liquid effluent from each reactor was recycled to the same reactor from which the effluent came. The amount of liquid effluent recycled from each reactor to the same reactor was controlled so that the feed to the first reactor contained reducible dimethyl terephthalate material with a heat of reduction to the corresponding saturated diester of about 0.10 part by weight of dimethyl terephthalate per part by weight of said feed to the first reactor and the feed to the second reactor contained reducible material with a heat of reduction to 1,4-cyclohexanedimethanol of about 0.10 part by weight of the corresponding saturated diester per pound of said feed to the second reactor. About 90 mole percent conversion of dimethyl terephthalate to 1,4-cyclohexanedimethanol was obtained.

EXAMPLE 6

Apparatus of the general arrangement of that illustrated by FIG. 2 was used to hydrogenate dimethyl terephthalate to 1,4-cyclohexanedimethanol. The first reactor of the first stage of the hydrogenation had an inside diameter of about 4 inches, and the second reactor had a diameter of about 2.4 inches. The first reactor of the second stage of the hydrogenation had an inside diameter of about 6 inches, and the second reactor had a diameter of about 4 inches. A flow of about 70 lbs. per hour of molten dimethyl terephthalate at a temperature of about 160° C. and a flow of about 1165 s.c.f.h. of a gas containing 98.9 volume percent hydrogen, 0.23 volume percent nitrogen, and 0.001 volume percent oxygen, 0.86 volume percent methane at a temperature of about 175° C. were fed to a hydrogenation unit consisting of four reactors such as those depicted in FIG. 2, the first two comprising the palladium-catalyzed stage and the second two the copper chromite-catalyzed stage. The pressure in the first reactor was 5500 p.s.i.g. and was slightly less than this in the fourth and final reactor. The stream of molten dimethyl terephthalate was joined by a liquid recycle stream which consisted of a portion of the effluent from the first reactor. This recycle stream was cooled to a temperature of about 175° C., and its rate of flow amounted to approximately 650 lbs. per hour. The first reactor contained about 34 lbs. of a palladium catalyst containing about 0.5% by weight palladium coated on 1/16 inch extruded alumina pellets (Lot No. 3079, Baker and Company, Inc.). The average temperature in this reactor was about 175° C. The effluent from the first reactor was cooled to about 175° C. before entering the second reactor, which contained about 15 lbs. of the same catalyst. The average temperature in this second reactor was about 210° C.

The effluent from the second reactor and about 1050 lbs. per hour of recycled liquid from the third reactor, connected in series and following the second, as indicated in FIG. 2 and as already described, after being cooled to 236° C., entered said third reactor. This third reactor, the first reactor of the second or copper chromite-catalyzed hydrogenation stage, contained about 140 lbs. of a copper chromite catalyst (Cu 1107 T 1/8″) manufactured by Harshaw Chemical Company. Any commercially available copper chromite catalyst may be used, however, preferably those suitable for use in fixed catalyst beds such as those described earlier herein. An analysis of this particular catalyst after calcining at 400° C. indicated approximately 33.2% by weight of Cu as CuO, 38.0% by weight Cr as $Cr_2O_3$, 10.4% by weight Ba as BaO, 3.5% by weight $Na_2O$, and 9.5% by weight $SiO_2$. The average temperature in the third reactor was about 270° C. The effluent from the third reactor, minus the recycled portion, was cooled to about 250° C. and then conducted to the fourth reactor, which contained about 60 lbs. of the same copper chromite catalyst. The average temperature in this reactor was about 260° C. The liquid effluent from this final reactor was of the following composition:

| Component: | Percent by wt. |
| --- | --- |
| Dimethyl 1,4-cyclohexanedicarboxylate | 0.1 |
| Methyl 4-hydroxymethylcyclohexane-carboxylate | 0.6 |
| 1,4-dimethylcyclohexane | 0.1 |
| 4-methylcyclohexanemethanol | 1.2 |
| 4-methoxymethylcyclohexanemethanol | 0.3 |
| 1,4-cyclohexanedimethanol | 68.0 |
| Methanol | 29.6 |
| Other constituents | 0.1 |

Approximately 97 mole percent conversion of the dimethyl terephthalate to 1,4-cyclohexanedimethanol was obtained. The vent gas from the fourth reactor amounted to about 250 s.c.f.h. and was of the following volumetric composition: hydrogen 93%, nitrogen 1%, methane 3.7%, oxygen 0.004%, carbon monoxide 0.15% and 2.146% of unidentified gas. After purification by condensation and adsorption as in Example 3, the vent gas was returned to the first reactor as substantially pure hydrogen, amounting to about 200 s.c.f.h. The entire operation just described was carried out over several periods, some as long as two months. During the course of these operations, only a very minute decline in catalyst activity was detected. The operations were continuous, and the temperatures in the reactors were maintained at or near the temperatures indicated over the entire course of the operation.

EXAMPLE 7

Dimethyl terephthalate was hydrogenated to 1,4-cyclohexanedimethanol as in Example 6 except that the vent gas was not purified and recycled, but instead about one pound of hydrogen per pound of material fed to each reactor was recirculated from each individual reactor to the same individual reactor in accordance with the hydrogen-recycling procedure of Example 1. Excellent, substantially complete conversion of dimethyl terephthalate 1,4-cyclohexanedimethanol was obtained.

EXAMPLE 8

The hydrogenation of dimethyl terephthalate to 1,4-cyclohexanedimethanol was again carried out as in Example 6 except that in addition about one-fourth of the effluent from the second and fourth reactors was recirculated respectively through said second and fourth reactors. More than 92 mole percent hydrogenation of dimethyl terephthalate to 1,4-cyclohexanedimethanol resulted.

EXAMPLE 9

A flow of about 70 lbs. per hour of molten dimethyl terephthalate at a temperature of about 160° C. and a flow of about 915 s.c.f.h. of gas containing 98.9 volume percent hydrogen, 0.23 volume percent nitrogen, 0.001 volume percent oxygen, and 0.86 volume percent methane at a temperature of about 150° C. were fed to a hydrogenation unit composed of four reactors in series such as shown in FIG. 2, the first two comprising the palladium-catalyzed hydrogenation stage and the second two the copper chromite-catalyzed hydrogenation stage. The pressure in the first reactor was 5500 p.s.i.g. and was slightly less than this in the fourth and final reactor. The hydrogen going into the first reactor was joined by a flow of about 246 s.c.f.h. of recovered gas which was vented from the fourth and last reactor. This stream of gas, which was substantially pure hydrogen as a result of condensation and adsorption as subsequently described was preheated to about 150° C. along with the fresh hydrogen feed stream. The stream of molten dimethyl terephthalate was joined by a liquid recycle stream from the first reactor which had been cooled to a temperature of about 175° C. and amounted to about 650 lbs. per hour. These materials flowed into the top of the reactor. The first reactor contained about 34 lbs. of a catalyst consisting essentially of about 0.5 percent palladium deposited on alumina. The average temperature in the reactor was about 175° C. The effluent from the first reactor passed through a heat exchanger where it was cooled to about 175° C., and then it entered the second reactor. This reactor contained about 15 lbs. of the same palladium catalyst. The average temperature in the reactor was about 213° C. The effluent from the second reactor was supplemented with about 1050 lbs. per hour of recycle liquid from the third reactor, and the combined stream passed through a heat exchanger where the temperature was lowered to about 236° C. This stream then entered the third reactor. This reactor contained about 140 lbs. of a copper chromite catalyst (Cu 1107 T 1/8″, Harshaw Chemical Company). The average temperature in the reactor was about 270° C. The feed stream for the fourth reactor flowed through a heat exchanger where its temperature was lowered to about 250° C. and then on into the top of the reactor. This reactor contained about 60 lbs. of copper chromite catalyst. The average temperature in the reactor was about 260° C. The liquid composition of the effluent from this reactor was approximately the same as that of the final effluent of Example 6, there having been a 97 mole percent conversion of the dimethyl terephthalate to 1,4-cyclohexanedimethanol. The vent gas from the fourth reactor amounted to about 265 s.c.f.h. and had the following composition by volume: oxygen, 0.002 percent; nitrogen, 1.0 percent; methane, 6.0 percent; carbon monoxide, 0.088 percent; and hydrogen, about 92.9 percent. This gas was cooled to a temperature of about 5° C. to condense water vapor and methyl alcohol vapor. These condensed liquids were collected in a receiver and removed periodically. The remaining gas was then heated to about 330° C. in a preheater and passed through about 30 lbs. of nickel-based catalyst maintained at about 330° C. in a methanator. The carbon monoxide reacted with hydrogen therein to produce methane and water. The effluent from the methanator was cooled to about 2° C. to condense most of the water resulting from the reaction. This water was collected in a receiver and removed periodically. The vent gas, now containing hardly any detectable amount of carbon monoxide, was further cooled to about −75° C. and then fed as in Example 3 into a methane adsorber maintained at about −75° C. and containing about 50 lbs. of a calcium aluminosilicate adsorbent, where practically all of the methane and nitrogen were adsorbed, leaving substantially pure hydrogen containing only small traces of oxygen and nitrogen. This gas was now at a pressure of about 5470 p.s.i.g. It was compressed to a pressure of about 5520 p.s.i.g. and fed back to the first hydrogenation reactor. Methane adsorbers were switched every few hours. While one was on stream, the other was being regenerated by reducing the pressure, increasing the temperature to between 100° C. and 300° C. and passing a flow of nitrogen therethrough. Only a small decline in catalyst activity was observed.

EXAMPLE 10

Apparatus of the general arrangement of that illustrated by FIG. 2 was used to hydrogenate dimethyl terephthalate to 1,4-cyclohexanedimethanol. The reactors again were tubular and had inside diameters of 2.4″. The first and second reactors contained a palladium catalyst consisting essentially of 0.5% palladium deposited on alumina. The third and fourth reactors each contained 6000 g. of ⅛″ pellets of a copper chromite catalyst which contained about 33% by weight Cu as CuO and about 38% by weight Cr as $Cr_2O_3$ in beds approximately 5 feet deep. Hydrogen, dimethyl terephthalate, and recycle material were introduced to the first reactor as in Example 6 and the effluent from the first reactor conducted to the second reactor also as in Example 6. The pressures and temperatures were the same as for the first and second reactors of Example 6. In other words, the first or palladium-catalyzed hydrogenation stage was carried on substantially as in Example 6. The pressure in the third reactor was 5500 p.s.i.g. The hydrogen pressure in the fourth reactor was 5350 p.s.i.g. The effluent from the second reactor was fed through a conduit corresponding to conduit 64 of FIG. 2 at a rate of approximately 10 lbs. per hour. Liquid flow rates in the various conduits in the reaction system corresponding to those in the second or copper chromite-catalyzed hydrogenation stage of FIG. 2 were 60 lbs. per hour in conduit 66, 50 lbs. per hour in conduit 68, 10.3 lbs. per hour in conduit 80. The feed entered the third reactor at a temperature of 250° C. and left at a temperture of 275° C. The feed entered the fourth reactor at a temperature of 250° C. and left at a temperature of 269° C. The concentration of 1,4-cyclohexanedimethanol in the various conduits corresponding to the second-stage hydrogenation reaction system of FIG. 2 were 53.6% by weight in conduit 66 and 64.4% by weight in conduits 68 and 80. Instead of being recycled as in FIG. 2, hydrogen was continuously vented to the outside from the gas-liquid separator corresponding to device 88 in FIG. 2 at a rate of 40 s.c.f.h. The ratio of vented hydrogen to hydrogen reacted was 0.555 mol./mol. The product of the reaction continuously removed from the gas-liquid separator had the following average composition in percent by weight:

| | |
|---|---|
| 1,4-cyclohexanedimethanol | 70.4 |
| Methanol | 28.0 |
| 4-methylcyclohexanemethanol | 1.2 |
| 4-[methoxymethyl]cyclohexanemethanol | 0.3 |
| Water | 0.1 |

The methanol was thereafter removed from the mixture by distillation. Conversion of dimethylterephthalate to 1,4-cyclohexanedimethanol amounted to approximately 95 mole percent.

EXAMPLE 11

Apparatus for the hydrogenation of dimethyl terephthalate to 1,4-cyclohexanedimethanol of the same general arrangement as that illustrated by FIG. 2 and described in Example 10 was used except that in the second stage of the hydrogenation reaction a gas-liquid separator was used in place of the reservoir located between reactors 3 and 4 of FIG. 2, the alcohol by-product in the gaseous portion of the contents of said gas-liquid separator was removed therefrom and continuously condensed and removed from the system and the uncondensed gas consisting mostly of hydrogen conveyed into the fourth reactor. The liquid portion from the gas-liquid separator was conducted on separately to the fourth reactor. The operating conditions for the first two reactors, that is, for the first or palladium-catalyzed stage of the operation were the same as in Example 6. Effluent from the second reactor was continuously fed at a rate of 20 lbs. per hour through a feed conduit corresponding to conduit 64 of FIG. 2. Liquid flow returns in the various conduits in the reaction system corresponding to those in FIG. 2 were 120 lbs. per hour in conduit 66, 100 lbs. per hour in conduit 68 and 20.6 lbs. per hour in conduit 80. The feed entered the third reactor or first reactor of the copper chromite-catalyzed stage at a temperature of 250° C. and left at a temperature of 270° C. The feed entered the fourth or final reactor at a temperature of 235° C. and left at a temperature of 275° C. Methanol in the vapor state resulting from the hydrogenation reaction was separated from the liquid reaction product with a gas-liquid separator, condensed and removed from the system. The concentration of 1,4-cyclohexanedimethanol in the various lines in the reaction system corresponding to those of FIG. 2 were 42.9% by weight in conduit 66 and 51.5% by weight in conduits 68 and 80. Instead of being recycled as in FIG. 2, hydrogen was continuously vented to the outside from the gas-liquid separator corresponding to the device 88 in FIG. 2 at a rate of 80 s.c.f.h. The ratio of vented hydrogen to hydrogen reacted was 0.555 mol./mol. The product of the reaction was continuously removed from the reaction system and had the following average composition in percent by weight:

| | |
|---|---|
| 1,4-cyclohexanedimethanol | 79.0 |
| Methanol | 19.3 |
| 4-methylcyclohexanemethanol | 1.2 |
| 4-[methoxymethyl]cyclohexanemethanol | 0.4 |
| Water | 0.1 |

The methanol was thereafter removed from the resulting reaction mixture by distillation. Greater than 90 mole percent hydrogenation of dimethyl terephthalate to 1,4-cyclohexanedimethanol was obtained.

Various modifications in the process of this invention as illustrated by the preceding examples are possible. For instance, heat exchange may be carried out by the hot and cold fluids. Two or more catalyst beds may be placed in a vertical stack in a single vessel, in which case a hold-up tray may be placed after each bed through which recirculation is used. The recirculation pumps may take suction from these trays. Furthermore, if desirable, some of the liquid streams may be withdrawn, cooled and returned to the reactors to control reaction temperatures.

The reaction temperatures in various reaction zones, whether there be a single zone or reactor, or a plurality of reactors, in each of the two catalytic stages, may be controlled by means of heat exchangers in the feed and recycle lines to the various reactors and by varying the percentage of reducible material in the feed to each reactor. The temperature of the feed and the percentage of reducible material in the feed conduits to the reactors are adjusted so that the heating resulting from the exothermic hydrogenation reaction effected in the reactors does not substantially exceed the maximum temperatures suggested above.

As the hydrogenation of dialkyl terephthalate to 1,4-cyclohexanedimethanol is exothermic, the temperature of the output of the reactors is generally somewhat higher than the temperature of the input to the reactors. The amount of reducible material fed to the reactors can be adjusted so that the temperature rise in the reactors does not exceed about 50° C., and preferably is within the range of about 10° C. to 35° C. The amount of reducible material in the feed to the first or palladium-catalyzed hydrogenation stage, as has been mentioned above, can be varied by correlating the amount of dialkyl terephthalate introduced into the system and the amount of partially reduced material recycled to enter the system therewith. Likewise, the amount of reducible material in the effluent fed to the second or copper chromite catalytic hydrogenation stage can be varied by correlating the amount of effluent from the first stage introduced into said second stage and the amount of reduced material recycled for reintroduction to said second stage.

The amount of material introduced to the first and second stages can be expressed in terms of an equivalent amount, i.e., an amount having the same heat of reduction, of dialkyl terephthalate for the first stage, or of dialkyl 1,4-cyclohexanedicarboxylate for the second stage.

When four reactors are used the first and second reactors are the first or palladium-catalyzed hydrogenation stage. The third and fourth reactors are the second or copper chromite-catalyzed stage. Thus the first, second, third and fourth reactors can be called respectively (1) the first zone of the first stage, (2) the second zone of the first stage, (3) the first zone of the second stage and (4) the second zone of the second stage. The adjustment of feed compositions of the four reactors for temperature control is as follows.

The feed for the first reactor is adjusted to contain reducible material having a heat of reduction to dialkyl 1,4-cyclohexanedicarboxylate equivalent to not more than 0.6, and preferably from about 0.04 to about 0.16, part by weight per part by weight of feed.

The feed for the third reactor is adjusted to contain reducible material having a heat of reduction to 1,4-cyclohexanedimethanol equivalent to not more than 0.6, and preferably from about 0.04 to about 0.16, part by weight per part by weight of feed. By establishing the ratio of material recycled to the first reactor of the first or palladium-catalyzed hydrogenation stage to the amount of dialkyl terephthalate fed into said first reactor to maintain the desired amount of reducible material in the feed, and by establishing the ratio of material recycled to the third reactor or first reactor of the second or copper chromite-catalyzed hydrogenation stage to the amount of effluent from the second reactor introduced to said third reactor, the amount of reducible material in the feed to both said second reactor and the fourth reactor is also established for a given set of reaction conditions. The feed to the second reactor usually contains reducible material having a heat of reduction to dialkyl 1,4-cyclohexanedicarboxylate equivalent to not more than 0.3, and more usually from about 0.02 to about 0.08, part by weight of dialkyl terephthalate per part by weight of feed material. The feed to the fourth reactor similarly usually contains reducible material having a heat of reduction to 1,4-cyclohexanedimethanol equivalent to not more than 0.3, and more usually from about 0.02 to about 0.08, part by weight of dialkyl 1,4-cyclohexanedicarboxylate per part of feed material. A major proportion of the reduction of the first or palladium-catalyzed hydrogenation stage is effected in the first reactor and a major proportion of the second or copper chromite-catalyzed hydrogenation stage is effected in the third reactor.

Hydrogen may be vented to the atmosphere in order to create a greater pressure differential between the first reactor and the final reactor, whether each hydrogenation stage contains only one or a plurality of reactors, thereby assisting in conveying the reactants and reaction products from one reactor to another. Pumps and valves at appropriate points in the feed lines may be used to regulate the desired pressure differential between reactors.

EXAMPLE 12

Dibutyl terephthalate was hydrogenated to 1,4-cyclohexanedimethanol as in Example 6. Excellent, substantially complete conversion was obtained to a product which was of the following composition in percent by weight:

| | Percent |
|---|---|
| Dibutyl-1,4-cyclohexanedecarboxylate | 0.2 |
| Butyl-4-hydroxymethylcyclohexanecarboxylate | 0.4 |
| 1,4-dimethylcyclohexane | 0.2 |
| 4-methylcyclohexanemethanol | 1.5 |
| 4-butoxymethylcyclohexanemethanol | 0.1 |
| 1,4-cyclohexanedimethanol | 49.1 |
| Normal butanol | 48.2 |
| Other constituents | 0.3 |

The surprising nature of the high mole percent conversion of dialkyl terephthalate to 1,4-cyclohexanedimethanol of the preceding examples, which vividly demonstrate the criticality of the palladium and copper chromite catalysts and their use in a specific order or sequence in the two-stage catalytic hydrogenation of a dialkyl terephthalate to 1,4-cyclohexanedimethanol of this invention, may be further emphasized by contrast with the results of Examples 13 to 16 below wherein respectively (1) the catalytic stages of this invention were reversed, (2) a single reactor with a single catalytic bed of mixed palladium-copper chromite catalyst was used, (3) a palladium catalyst was the only catalyst used and (4) a copper chromite catalyst was the only catalyst used. The palladium and copper chromite catalysts used in these examples were the same as those used in Example 1.

EXAMPLE 13

A flow of about 65 lbs. per hour of molten dimethyl terephthalate at a temperature of about 160° C. and a flow of about 815 s.c.f.h. of a gas containing 98.9 volume percent hydrogen, 0.3 volume percent nitrogen, 0.006 volume percent oxygen and 0.7 volume percent methane at a temperature of about 175° C. were fed to an apparatus like that of FIG. 2 and described in Example 6 except that Reactors 3 and 4 were replaced by Reactors 1 and 2 and vice versa. This change of sequence of reactors was done to place the copper chromite catalyst first and the palladium catalyst last in the flow sequence, that is, to allow the use of the copper chromite catalyst in a first hydrogenation stage and a palladium catalyst in a second hydrogenation stage. The following catalyst bed temperatures were maintained by auxiliary apparatus: first reactor 270° C., second reactor 260° C., third reactor 175° C., and fourth reactor 210° C. A purge gas stream was continuously withdrawn from the bottom of the fourth reactor. The operating pressure was about 5500 p.s.i.g. The effluent collected from the fourth and final reactor after the operation had been carried on in this manner for about 7 hours consisted of a two-phase liquid having 10% by volume in the upper phase and 90% by volume in the lower phase. The upper phase consisted largely of low-boiling aliphatic esters and the bottom phase of about 30% methanol, water and p-xylene, 26% methyl p-toluate, 2% dimethyl terephthalate. The remaining 42% was made up of three unidentified compounds. The gas vented from the fourth reactor at the rate of approximately 215 s.c.f.h. was composed of 93.6 volume percent hydrogen, 1.4 volume percent nitrogen, 3.2 volume percent methane, 0.03 volume percent oxygen, and about 2 volume percent of unidentified gas.

EXAMPLE 14

A flow of about 30 lbs. per hour of molten dimethyl terephthalate at a temperature of about 160° C. and a flow of about 300 s.c.f.h. of a gas containing 99 volume percent hydrogen, 0.2 volume percent nitrogen, 0.8 volume percent methane, and 0.002 volume percent oxygen at a temperature of about 175° C. were fed to a single reactor containing a single catalyst bed made by mixing 20 lbs. of palladium catalyst with 100 lbs. of copper chromite catalyst. The average temperature in the catalyst bed was maintained at about 200° C. by recycling about 325 lbs. per hour of the reactor effluent back to the reactor after it had been cooled to about 175° C. and by auxiliary equipment. The operating pressure was maintained at about 5500 p.s.i.g. A purge gas stream was continually withdrawn from the bottom of the reactor. The liquid effluent from the reactor withdrawn after about 8 hours of operation in this manner was of the following composition:

| Component: | Percent by wt. |
|---|---|
| Dimethyl 1,4-cyclohexanedicarboxylate | 91.8 |
| Low boilers, including water | 5.5 |
| 4-methylcyclohexanemethanol | 0.1 |
| Dimethyl terephthalate and monoester | 2.2 |
| Unidentified | 0.4 |
| 1,4-cyclohexanedimethanol | Trace |

The gas vented from the reactor amounted to about 132 s.c.f.h. and was composed of 96 volume percent hydrogen, 0.5 volume percent nitrogen, 1.8 volume percent methane, 0.005 volume percent oxygen, 0.001 volume percent carbon monoxide, and 1.694 volume percent of unidentified gas. At the end of this 8-hour run the catalysts were removed and examined. The color of the copper-chromite catalyst had changed from dark grayish-black to a reddish-pink color. This change in color is typical during deactivation of copper chromite catalyst.

EXAMPLE 15

A flow of about 75 lbs. per hour of molten dimethyl terephthalate at a temperature of about 160° C. and a flow of about 550 s.c.f.h. of a gas containing 98.6 volume percent hydrogen, 0.5 volume percent nitrogen, 0.7 volume percent methane, and 0.002 volume percent oxygen at a temperature of about 175° C. were fed to an apparatus similar to that used in Example 6 except that the third reactor contained about 35 lbs. of palladium catalyst, and the fourth reactor contained about 15 lbs. of palladium catalyst. In other words, a palladium catalyst (0.5% palladium deposited on alumina) was the only one used in the reactors. The temperature in the first reactor was maintained at an average of about 175° C. by feeding about 680 lbs. an hour of cooled, crude product from this reactor back into the top of the reactor. The average temperature in the second reactor was kept at about 210° C. The average temperatures in the third and fourth reactors were maintained at about 190° C. by auxiliary apparatus. The operating pressure was about 5500 p.s.i.g. A vent gas stream of about 98 s.c.f.h. was continuously withdrawn from the fourth reactor. The liquid effluent withdrawn from the fourth reactor after about 16 hours of operation in this manner was of the following composition:

| Component: | Percent by wt. |
|---|---|
| Dimethyl 1,4-cyclohexanedicarboxylate | 89.0 |
| Methyl p-toluate | 0.1 |
| Methyl 4-methylcyclohexanecarboxylate | 3.2 |
| 1,4-dimethylcyclohexane | 3.1 |
| Unidentified high boilers plus water | 4.6 |
| 1,4-cyclohexanedimethanol | Trace |

The gas vented from the fourth reactor amounted to about 98 s.c.f.h. This gas was composed of 94 volume percent hydrogen, 2.1 volume percent nitrogen, 3.5 volume percent methane, 0.01 volume percent oxygen, and 0.39 volume percent of unidentified gas.

EXAMPLE 16

A flow of about 70 lbs. per hour of molten dimethyl terephthalate at a temperature of about 160° C. and a flow of about 800 s.c.f.h. of a gas containing 98.8 volume percent hydrogen, 0.2 volume percent nitrogen, 0.9 volume percent methane, and 0.001 volume percent oxygen were fed to an apparatus like that of FIG. 2 and described in Example 6 except that all reactors contained a copper chromite catalyst. Reactor 3 contained about 140 lbs. of copper chromite catalyst. Reactors 1 and 4 each contained about 60 lbs. and Reactor 2 about 20 lbs. of copper chromite catalyst. The average temperature of each reactor was maintained at about 260° C. by recycling crude product to Reactors 1 and 3 as done in Example 6, and also by the use of auxiliary equipment. The operating pressure was about 5500 p.s.i.g. A purge gas stream was continuously withdrawn from the fourth reactor. The liquid effluent from the fourth reactor after several hours of operation in this manner was a white slush which was found to be 26% dimethyl terephthalate and 74% liquid in two immiscible layers. The top layer (10% by volume) was a mixture of low-boiling aliphatic ester and dimethyl 1,4-cyclohexanedicarboxylate. The bottom layer was found to have about 33% low-boiling material (methanol, water, and p-xylene), 46% methyl p-toluate, 7% unreacted dimethyl terephthalate and the remaining 14% divided among four unknown materials. No appreciable amount of 1,4-cyclohexanedimethanol was found. After an appreciable period of operation, the catalyst became partly inactive, and large quantities of dimethyl terephthalate and methyl p-toluate were contained in the liquid product withdrawn from the fourth reactor. During this run the gas vented from the fourth reactor amounted to approximately 305 s.c.f.h. The gas was composed of 94.5 volume percent hydrogen, 0.7 volume percent nitrogen, 3.9 volume percent methane, 0.003 volume percent oxygen, 0.2 volume percent carbon monoxide and 0.697 volume percent of unidentified gas.

Thus, we have discovered a novel process for efficiently hydrogenating dialkyl terephthalate to the corresponding saturated glycol, this glycol product having considerable utility for preparing polyester materials of the "miracle fiber" type. In the present process we have found that by a two-stage hydrogenation process wherein a palladium catalyst is employed in the first stage and a copper chromite catalyst is employed in the second stage, the present hydrogenation reaction is efficiently effected. Such results were quite unexpected as illustrated in Examples 13 and 15 above wherein a palladium catalyst alone or a copper chromite catalyst alone is ineffective in the subject hydrogenation reaction. Likewise, if a palladium catalyst and a copper chromite catalyst are mixed together in a single reactor, or if the first stage in the present process is a copper chromite catalyst in lieu of a palladium catalyst and the second stage in the present process is a palladium catalyst in lieu of a copper chromite catalyst, the subject hydrogenation of dialkyl terephthalate to 1,4-cyclohexanedimethanol is unsuccessful or inefficient for commercial operations.

A valuable and unexpected characteristic of our process is that the two catalytic stages, i.e., the palladium stage and the copper-chromite stage, cooperate in an unusual manner in the sequence in which they are used. The palladium catalyst stage yields a product that is particularly adapted for further hydrogenation over copper chromite to produce in high yield a 1,4-cyclohexanedimethanol product that is suitable for polyester manufacture with little or no purification other than flash distillation to remove methanol. The 1,4-cyclohexanedimethanol thus produced is essentially free of substances that would contaminate the polyester and make it unsuitable for fiber manufacture and essentially free of monofunctional acids or alcohols that would terminate the polyester chain prematurely.

We have found that the copper chromite hydrogenation stage is sensitive to the presence of the monoalkyl ester of 1,4-cyclohexanedicarboxylic acid (referred to for brevity as the "acid-ester") which is formed as a by-product in the first hydrogenation stage. Our investigations have shown that concentrations of the acid-ester up to about 2 weight percent in the feed for the copper chromite can be tolerated. However, with substantially larger concentrations, e.g., 5 weight percent, of acid-ester in the dialkyl cyclohexanedicarboxylate feed the activity of the copper chromite catalyst decreases markedly.

A series of hydrogenation runs have been carried out that demonstrate the unexpected superiority of palladium over nickel catalysts in hydrogenating dialkyl terephthalates without excessive formation of the undesirable acid-ester. The following table lists the results of such runs in the hydrogenation of dimethyl terephthalate over a series of catalysts. In the table all percentages are weight percentages and the following abbreviations are used: DMT=dimethyl terephthalate; DMCD=dimethyl 1,4-cyclohexanedicarboxylate. The paladium catalyst was composed of 5 weight percent palladium on alumina. The nickel catalysts (A) and (B) were products of the Girdler Company, G49A and G49B respectively, the former being 60–65% nickel on kieselguhr and the latter 50–55% nickel on kieselguhr. All catalysts were in powdered form. The reactions were run for 2 hours in a stirred autoclave at the temperature and pressure shown.

HYDROGENATION OF DMT TO DMCD

| Cat. | Activity,[1] percent | Acid-Ester Content,[2] percent | Low Boilers,[3] percent | DMCD, percent | High Boilers,[4] percent | Reaction Conditions | |
|---|---|---|---|---|---|---|---|
| | | | | | | T., °C. | P., p.s.i. |
| Pd | 94 | 1.9 | 4.2 | 93 | 2 4 | 250 | 3,000 |
| Ni (A) | 100 | 9.95 | 22.6 | 76.3 | 1.1 | 250 | 3,000 |
| Ni (A) | 92 | 0.22 | 12.4 | 82.3 | 5.3 | 250 | 3,000 |
| Ni (A) | 41 | 0.23 | 8.9 | 85.3 | 5.8 | 180 | 3,000 |
| Ni (B) | 100 | 10.4 | 27.9 | 70.9 | 1.2 | 250 | 3,000 |
| Ni (B) | 96 | 0.45 | 14.6 | 83.0 | 2.4 | 200 | 3,000 |
| Ni (B) | 54 | 0.21 | 7.2 | 86.3 | 6.5 | 180 | 3,000 |

[1] The activity is expressed as the percent DMT consumed in the reaction.
[2] The acid-ester content is given by the percent 1,4-cyclohexanedicarboxylic acid, monomethyl ester.
[3] Low boilers are 4-methylcyclohexanemethanol with traces of methyl p-toluate and its cyclohexane analog.
[4] High boilers are principally CHDM and its intermediate: 4-hydroxymethylcyclohexanecarboxylic acid, methyl ester.

The table shows that to get roughly 100% activity with either of the nickel catalysts one must hydrogenate at around 250° C. and 3000 p.s.i. Under these conditions the product has a relatively low (70–76%) content of DMCD and, worse still, a high acid-ester content (10%) which has a bad effect on the subsequent hydrogenolysis over copper chromite. Also to be noted is the extremely large "low boiler" content of the nickel catalyst product. This is chiefly 4-methylcyclohexanemethanol and, unlike the "high boilers," it represents a total loss in the process. Lower temperature decreases the acid-ester content to a level a little below that produced by palladium but at the cost of lower activity and excessive formation of low boilers.

Although the invention has been described in considerable detail with reference to certain preferred embodiments thereof, it will be understood that variations and modifications can be effected within the spirit and scope of the invention as described hereinabove and as defined by the appended claims.

We claim:

1. A process for the preparation of 1,4-cyclohexanedimethanol which comprises reacting a dialkyl terephthalate with hydrogen in a first hydrogenation stage in the presence of a palladium hydrogenation catalyst under hydrogenation conditions, passing effluent from said first hydrogenation stage through a second hydrogenation stage in the presence of a copper chromite hydrogenation catalyst under hydrogenation conditions, and recovering 1,4-cyclohexanedimethanol from said second hydrogenation stage.

2. The process according to claim 1 wherein the pressure in the hydrogenation stages is from about 50 to about 500 atmospheres and the temperature therein from about 100° C. to about 400° C.

3. The process according to claim 1 wherein a portion of the liquid effluent from the first hydrogenation stage is recycled and reintroduced into said first hydrogenation stage and a portion of the liquid effluent from the second hydrogenation stage is recycled and reintroduced into said second hydrogenation stage.

4. The process according to claim 1 wherein each hydrogenation stage is divided into a plurality of zones.

5. The process according to claim 4 wherein a portion of the liquid effluent from the first zone of the first hydrogenation stage is recycled to said first zone of the first hydrogenation stage and a portion of the liquid effluent from the first zone of the second hydrogenation stage is recycled to said first zone of the second hydrogenation stage.

6. The process according to claim 4 wherein a portion of the liquid effluent from each zone of the first and second hydrogenation stages is recycled to the same zone from which said effluent came.

7. A process for the preparation of 1,4-cyclohexanedimethanol which comprises partially hydrogenating a dialkyl terephthalate in a first hydrogenation stage by contact with hydrogen in the presence of a palladium hydrogenation catalyst under hydrogenation conditions, passing hydrogen-containing effluent from said first stage through a second hydrogenation stage in contact with a copper-chromite hydrogenation catalyst and under hydrogenation conditions adapted to continue the hydrogenation of the first stage effluent, and recovering hydrogen and 1,4-cyclohexanedimethanol from said second stage the hydrogenation pressure and temperature of said first and second stages being about 50 to about 500 atmospheres and about 100° C. to 400° C.

8. A continuous process for the preparation of 1,4-cyclohexanedimethanol which comprises establishing a continuous flow of dialkyl terephthalate through a first zone of the first of two hydrogenation stages, introducing hydrogen to said first zone of the first hydrogenation stage and therein partially hydrogenating said dialkyl terephthalate, continuously recycling a portion of the liquid effluent with additional dialkyl terephthalate to said first zone of said first hydrogenation stage, passing the remainder of said effluent containing hydrogen to a second zone of the first hydrogenation stage and therein continuing hydrogenation of said dialkyl terephthalate, passing effluent containing hydrogen from said second zone of the first hydrogenation stage to the first zone of a second hydrogenation stage and continuing hydrogenation of said effluent therein, recycling a portion of liquid effluent from said first zone of the second hydrogenation stage to said zone, passing the remainder of said effluent containing hydrogen to a second zone of the second hydrogenation stage, completing the hydrogenation in said second zone of the second hydrogenation stage, recovering 1,4-cyclohexanedimethanol from said second zone of the second hydrogenation stage, all of said reaction zones being maintained at a pressure of about 50 to about 500 atmospheres and a temperature of about 100° C. to about 400° C., the zones of the first hydrogenation stage containing a palladium hydrogenation catalyst and the zones of the second hydrogenation stage containing a copper chromite hydrogenation catalyst.

9. A method for catalytically reducing dimethyl terephthalate to 1,4-cyclohexanedimethanol which comprises continuously passing hydrogen and a liquid stream comprising dimethyl terephthalate to a first zone of a first of two hydrogenation stages and therein initiating hydrogenation of said dimethyl terephthalate, continuously removing an effluent from said first zone comprising partially hydrogenated material and hydrogen, separating from said effluent a portion of the partially hydrogenated liquid component thereof, continuously recycling said portion of the partially hydrogenated material, thus forming with fresh dimethyl terephthalate a total feed to said first zone of the first hydrogenation stage, said total feed containing an amount of reducible material having a heat of reduction to dimethyl 1,4 - cyclohexanedicarboxylate equivalent to not more than 0.6 part by weight of dimethyl terephthalate per part by weight of said total feed, continuously passing the remainder of said effluent comprising partially hydrogenated material and hydrogen to a second zone of said first hydrogenation stage, said remainder containing an amount of reducible material having a heat of reduction to dimethyl 1,4-cyclohexanedicarboxylate equivalent to not more than about 0.3 part by weight of dimethyl terephthalate per part by weight of said remainder, continuing the hydrogenation in said second zone, continuously withdrawing effluent from said second zone comprising partially hydrogenated material and hydrogen, passing the latter effluent to the first zone of a second hydrogenation stage, further hydrogenating the partially hydrogenated material in said latter zone, continuously withdrawing further hydrogenated material from said first zone of the second hydrogenation stage, separating from said effluent a portion of the further hydrogenated liquid component thereof, continuously recycling said portion to the latter zone, thus forming a total feed to said first zone of the second hydrogenation stage with the hydrogenated material and hydrogen withdrawn from the second zone of the first hydrogenation stage, the latter feed comprising material having a heat of reduction to 1,4-cyclohexanedimethanol equivalent to not more than about 0.6 part by weight of dimethyl 1,4-cyclohexanedicarboxylate per part by weight of said feed, continuously passing the hydrogen-containing remainder of the effluent from said first zone of the second hydrogenation stage to a second zone of the second hydrogenation stage, said remainder containing material having a heat of reduction to 1,4-cyclohexanedimethanol equivalent to not more than about 0.3 part by weight of dimethyl 1,4-cyclohexanedicarboxylate per part by weight of said remainder forming the feed to said second zone of the second hydrogenation stage, continuing the hydrogenation in said latter zone of material not yet hydrogenated to 1,4-cyclohexanedimethanol, and continuously recovering 1,4-cyclohexanedimethanol from said latter zone, the hydrogenation pressure and temperature in all of said zones being about 50 to about 500 atmospheres and about 100° C. to about 400° C., said first and second zones of the first hydrogenation stage containing a fixed bed palladium hydrogenation catalyst and said first and second zones of the second hydrogenation zone containing a fixed bed copper-chromite hydrogenation catalyst.

10. A process for the continuous hydrogenation of dimethyl terephthalate to 1,4-cyclohexanedimethanol which comprises introducing dimethyl terephthalate to a first hydrogenation stage containing a palladium hydrogenation catalyst, introducing hydrogen thereto to maintain a pressure of from about 50 to about 500 atmospheres in said first hydrogenation stage, subjecting the dimethyl terephthalate in said first hydrogenation stage to a partial hydrogenation at a temperature of from about 100° C. to about 400° C., withdrawing a portion of the hydrogen from said first hydrogenation stage, cooling and compressing said portion of hydrogen, and reintroducing said portion of hydrogen to said first hydrogenation stage, said portion of hydrogen reintroduced into said first hydrogenation stage amounting to between about 0.9 and 1.8 lbs. of hydrogen reintroduced to said first hydrogenation stage per pound of dimethyl terephthalate introduced to said first hydrogenation stage, conveying the partially hydrogenated dimethyl terephthalate from said first hydrogenation stage to a second hydrogenation stage, said second hydrogenation stage containing a copper-chromite hydrogenation catalyst, along with sufficient hydrogen from said first hydrogenation stage to complete the hydrogenation of said dimethyl terephthalate in said second hydrogenation stage to 1,4-cyclohexanedimethanol, maintaining a pressure in said second hydrogenation stage of from about 50 to about 500 atmospheres and a temperature of from about 100° C. to about 400° C., withdrawing a portion of the hydrogen from said second hydrogenation stage, cooling and compressing said portion of hydrogen, and reintroducing said portion of hydrogen with the partially hydrogenated dimethyl terephthalate from said first hydrogenation stage to said second hydrogenation stage, said portion of hydrogen reintroduced with the partially hydrogenated dimethyl terephthalate from said first hydrogenation stage to said second hydrogenation stage amounting to between about 1.0 and about 3.0 parts by weight of hydrogen reintroduced with the partially hydrogenated dimethyl terephthalate from said first hydrogenation stage per part by weight of said partially hydrogenated dimethyl terephthalate conveyed from said first hydrogenation stage to said second hydrogenation stage, completing the hydrogenation of dimethyl terephthalate to 1,4-cyclohexanedimethanol in said second hydrogenation zone, and removing 1,4-cyclohexanedimethanol from said second hydrogenation stage.

11. The process of claim 10 in which the 1,4-cyclohexanedimethanol from said second hydrogenation stage is subjected to flash distillation to remove methanol and without further purification is passed to polyester manufacture.

References Cited

UNITED STATES PATENTS

| | | | |
|---|---|---|---|
| 2,105,664 | 1/1938 | Lazier | 260—617 |
| 2,755,317 | 7/1956 | Kassel | 260—690 |
| 2,830,095 | 4/1958 | Nicholaisen | 260—634 |

OTHER REFERENCES

Emmett, "Catalysis," vol. V (1957), pp. 183–9, 207–10.

LEON ZITVER, *Primary Examiner.*

M. B. ROBERTO, J. E. EVANS, *Assistant Examiners.*